Sept. 6, 1938.   J. C. CURTIS   2,129,566
FLUID OPERATED TOOL
Filed Nov. 30, 1936
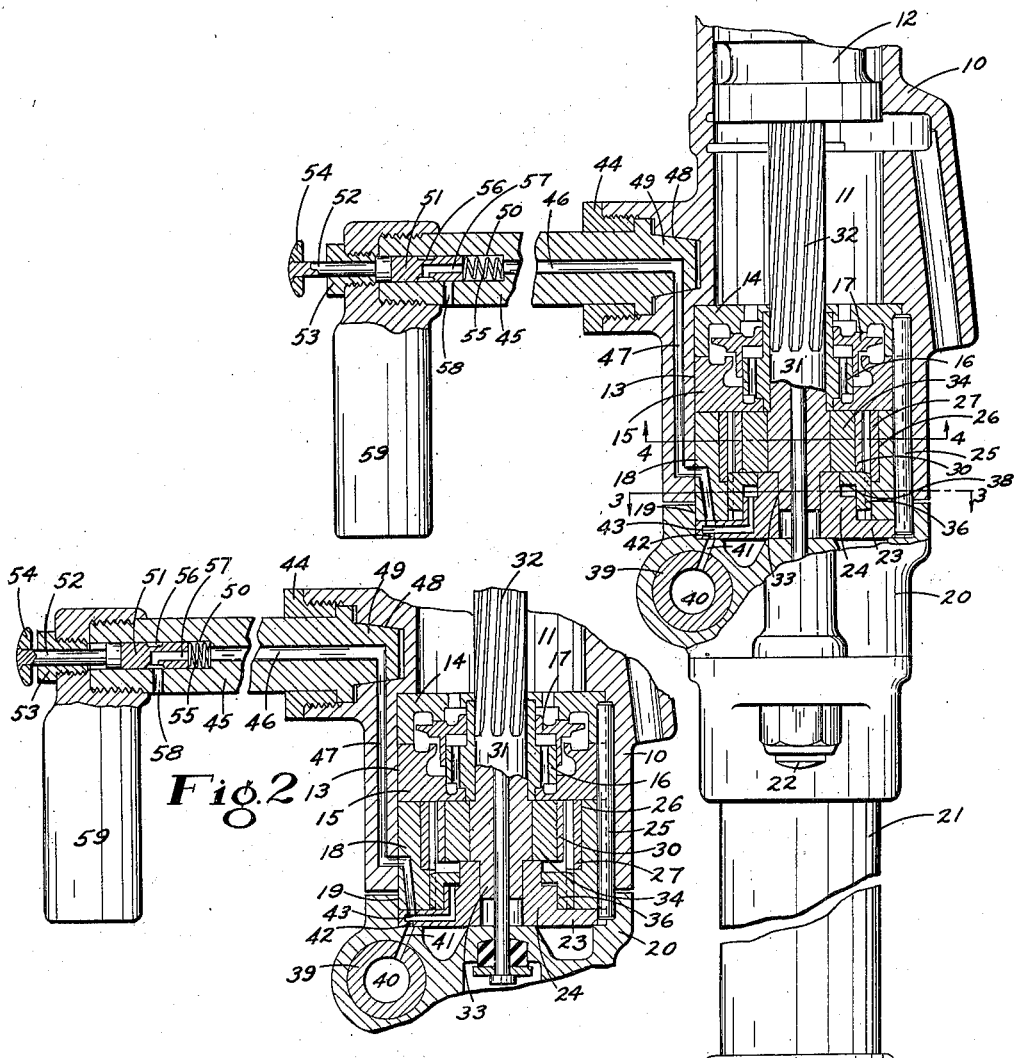
JOHN C. CURTIS
INVENTOR
BY 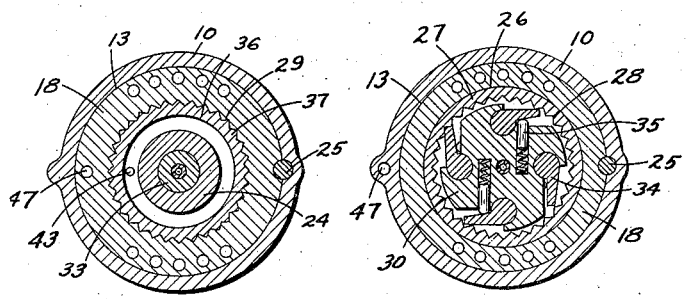
ATTORNEY Patented Sept. 6, 1938

2,129,566

UNITED STATES PATENT OFFICE 2,129,566

FLUID OPERATED TOOL

John C. Curtis, Garfield Heights, Ohio, assignor to The Cleveland Rock Drill Company, Cleveland, Ohio, a corporation of Ohio Application November 30, 1936, Serial No. 113,275

6 Claims. (Cl. 121—7)

This invention relates broadly to rock drills, but more particularly to a rotation mechanism for rock drills of the stoper type.

One object of this invention is to provide a fluid actuated rock drill having a rotation mechanism for rotating the tool implement with means operable to enable the rotation mechanism to be rendered ineffective at will.

Another object of this invention is to produce an improved rotation mechanism for rock drills which is simple in construction and operation, durable and efficient.

Other objects more or less ancillary to the foregoing and the manner in which all the various objects are realized will appear in the following description which, considered in connection with the accompanying drawing, set forth the preferred embodiment of the invention.

Fig. 1 is a side elevational view of a portion of a rock drill shown partly in section to illustrate the invention. In this view the rotation mechanism is shown in operative position.

Fig. 2 is a view similar to Fig. 1, showing the rotation mechanism in inoperative position.

Fig. 3 is a cross sectional view taken on the line 3—3 in Fig. 1.

Fig. 4 is a cross sectional view taken on the line 4—4 in Fig. 1.

Referring to the drawing in which like symbols designate corresponding parts throughout the several views, 10 represents a housing having a cylindrical chamber 11 within which is reciprocably mounted a hammer 12. Toward its lower end the cylindrical chamber 11 is enlarged in a counterbore 13 accommodating a valve cap 14 and valve block 15. Within this valve cap and block, there is a stationary bushing 16 and valve 17, the latter being automatically reciprocable for controlling the admission of the pressure fluid into the cylinder for actuating the piston in the usual manner well known by those skilled in the art.

Disposed within the counterbore 13 below the valve block 15, there is an annular casing 18 projecting beyond the end of the housing 10 into a counterbore 19 formed within a head 20, which head is clamped between the housing 10 and a feed cylinder 21 by side bolts 22.

Disposed within the counterbore 19 in abutting engagement with the lower end of the casing 18, there is the flange 23 of a bearing member 24. This member, casing 18, valve block 15 and valve cap 14 are locked against rotation relative to the housing 10 by a dowel 25.

The casing 18 is provided with a counterbore 26 having a ratchet ring 27 rotatable therein and provided internally with ratchet teeth 28. Below the counterbore 26 the internal wall of the casing 18 is also formed with teeth 29 having the same root diameter as the teeth 28 and, in fact, being exact replica of the teeth 28.

Rotatably mounted within the ratchet ring 27, there is the head 30 of a stem 31 which extends through the bushing 16 into the cylindrical chamber 11. This stem is formed with rifle splines 32 cooperating or slidably interlocked with similar splines formed within the piston 12. Depending from the head 30, there is a continuation of the stem 31, reduced in diameter to form a bearing 33 rotatably mounted within the bearing member 24. The head 30 is properly machined to pivotally carry four pawls 34, each constantly urged into engagement with the teeth 28 of the ratchet ring 27 by a spring pressed plunger 35. The pawls 34 and the head 30 are mounted between the valve block 15 and bearing member 24, which engage the head and pawls for locking them against axial movement. The height of the head 30 is substantially equal to that of the pawls 34 but somewhat smaller than the height of the ratchet ring 27, thus leaving the lower portion of the ratchet teeth 28 adjacent the teeth 29 free from engagement with the pawls 34.

Slidably mounted on the bearing member 24, there is a clutch element 36 having its peripheral wall formed with teeth 37 slidably engaging the teeth 29 of the casing 18, and capable of engagement with the lower portion of the ratchet teeth 28. This clutch element is provided with an actuating area 38.

The center head 20 is adequately machined to rotatably receive a throttle valve 39 formed with a central bore 40 having pressure fluid admitted therein. From this bore 40, pressure fluid may be admitted to the actuating area 38 of the clutch element 36 through a plurality of interconnected ports 41, 42 and 43, the port 42 being a port smaller than the port 43.

Extending laterally from the housing 10, and secured thereto by a nut 44, there is a rotating handle 45 having a port 46 extending therethrough and communicating with the port 43 through a port 47 which is also larger than the port 42, and opens into the port 43 vis-à-vis the port 42. To assure a fluid tight joint between the cylinder housing 10 and the handle, the former is provided with a tapered socket 48 adapted to receive the corresponding tapered end 49 of the handle. Toward the outer end of the handle, the port 46 is enlarged in a counterbore 50 to slidably receive a valve 51. Engaging the end of this valve, there is an operating rod 52 extending through a retaining nut 53 and terminated by a button 54. The valve 51 is constantly urged toward the nut 53 by a compression spring 55. Intermediate its ends, the valve 51 is formed with an annular groove 56 which is in communication with the counterbore 50 and port 46 through a port 57 formed within the valve. Leading from the counterbore 50 to the atmosphere, there is a port 58 which is capable of communication with the groove 56. Depending from the outer end of the handle 45, there is the usual handle grip 59 adapted to be grasped by the operator.

In the operation of the machine, let it be assumed that pressure fluid from the throttle valve 39 is admitted into the valve block and cap 13 and 14 from where it is controlled by the automatic valve 17 and distributed into the cylindrical chamber 11 for effecting the reciprocation of the hammer or piston 12. During the normal operation of the machine, the handle valve 51 is located as shown in Fig. 1, and pressure fluid from the throttle valve chamber 40 is also admitted to the actuating area 38 of the clutch member 36 through the ports 41, 42 and 43. The ports 46 and 47 opening in the port 43 are now closed by the valve 51, thus causing the pressure fluid to act on the actuating area 38 for positioning the clutch member 36 as shown in Fig. 1, that is, with its teeth 37 engaging the lower portion of the ratchet ring teeth 28. Since the teeth 37 of the clutch member are also engaging the teeth 29 of the stationary casing 18, it will be understood that the ratchet ring 27 is now locked against rotation. During the movement of the piston 12 toward the valve cap 14, the piston due to its operative connection with the rifled stem 31, will tend to rotate the stem in a clockwise direction in Fig. 4, which rotation is prevented by the engagement of the pawls 34 with the teeth 28 of the now stationary ratchet ring 27, thus causing the piston to rotate in a counterclockwise direction. In the type of rock drills described, the piston is operatively connected to the drill steel or cutting tool for transmitting rotation thereto through a chuck arrangement well known by those skilled in the art, and since that chuck mechanism does not form a part of this invention, no further description of the same is thought necessary other than pointing out that the rotation of the piston is transmitted to the drill steel during the normal drilling operation.

During the movement of the piston 12 away from the valve block 14, the stem 31 will rotate in a counterclockwise direction in Fig. 4, while the pawls 34 are simply riding the teeth 28.

In practice, when the drill steel has become wedged in the rock being drilled, it is desirable to have the piston deliver blows to the drill steel without imparting rotation thereto. When this condition occurs, the operator holding the handle grip 59 will simply apply pressure on the button 54 for shifting the valve 51 into the position shown in Fig. 2, and establishing communication between the valve annular groove 56 and exhaust port 58. Since the opening of the port 42 into the port 43 is located vis-à-vis the similar opening of the port 47, the pressure fluid from the throttle valve chamber 40 will flow through the ports 41 and 42, across the port 43 and into the port 47, from where it is free to escape to the atmosphere via the port 46, the valve port 57 and the exhaust port 58. The port 47 being larger than the port 42 will allow the free flow of the pressure fluid across the port 43, thus causing a suction within the port 43 and a consequential suction or partial vacuum on the actuating area 38 of the clutch member 36 effecting its shifting into the position shown in Fig. 2. Any frictional resistance or binding action which might normally maintain the clutch member 36 in engagement with the ratchet ring 27, will be overcome by the vibrations imparted to the entire machine due to the reciprocatory motion of the hammer 12, thereby allowing a free and positive disengagement of the clutch member. In this last position of the clutch member 36, the ratchet ring 27 is free to rotate within the stationary housing 18, thus permitting the oscillatory movement of the rifled stem 31 during the reciprocation of the piston 12 without effecting the rotation of the piston and the drill steel.

When it is desired to again impart rotation to the drill steel, the operator will cease to exert pressure on the button 54, allowing the valve 51 to shift into the position shown in Fig. 1 due to the compression spring 55 acting on the valve.

From the foregoing detailed description, it will be apparent that I have provided a control means for effecting the rotation of a cutting tool in a rock drill, embodying a simple and efficient construction, and it is to be understood that the specific terminology is not intended to be restrictive and confining, and that various rearrangement of parts may be resorted to without departing from the scope and spirit of the invention as herein claimed.

I claim:

1. In a rock drill, the combination with a cylinder and a reciprocatory piston therein capable of rotation, a rotation mechanism for said piston including a rifle bar wherewith said piston is slidably interlocked, a rotatable ring having teeth formed in the interior thereof, pawls carried by said bar operatively engaging said teeth, a stationary casing having teeth in the interior thereof constituting an extension of the teeth of said ring, a slidable member having teeth constantly interlocked with the teeth of said casing and capable of interengagement with the teeth of said ring for locking said ring against rotation to render said mechanism operative, and means for selectively causing the interengagement of the teeth of said member with the teeth of said ring.

2. In a rock drill, the combination with a cylinder and a piston reciprocating therein and capable of rotation, of a ratchet mechanism for selectively effecting such rotation including a ring having teeth formed internally thereof, a rifle bar operatively associated with said piston and the teeth of said ring, a non-rotatable member pneumatically movable into or out of locking engagement with the teeth of said ring, and a single valve controlled port for selectively controlling the movement of said member.

3. In a rock drill, the combination with a cylinder and a reciprocatory piston therein capable of rotation, a rotation mechanism for said piston including a rifle bar wherewith said piston is slidably interlocked, a stationary casing, a ring rotatable within said casing having longitudinal teeth extending therethrough, pawls carried by said bar operatively engaging the teeth of said ring, longitudinal teeth within said casing of a pitch diameter equal to the teeth of said ring, a slidable member having teeth constantly interlocked with the teeth of said casing and capable of interengagement with the teeth of said ring for locking the ring against rotation, and means for selectively causing the interengagement of the teeth of said member with the teeth of said ring.

4. In a rock drill, the combination with a cylinder and a reciprocatory piston therein capable of rotation, a rotation mechanism for said piston including a rifle bar wherewith said piston is slidably interlocked, a rotatable ring and a stationary ring coaxially disposed and having internal teeth extending therethrough, pawls carried by said bar operatively engaging the teeth of said rotatable ring, a slidable member having external teeth constantly interlocked with the teeth of said stationary ring and capable of interengagement with the teeth of said rotatable ring for locking it against rotation to render said mechanism operative, and means for selectively causing the interengagement of the teeth of said member with the teeth of said rotatable ring.

5. In a rock drill, the combination with a cylinder and a piston reciprocating therein and capable of rotation, of a rotation mechanism for selectively effecting such rotation including a rotatable ratchet ring and a rifle bar operatively associated with said piston and ring, a non-rotatable slidable member, clutch means on said ring and member capable of interengagement for effecting the operation of said mechanism and capable of release for rendering said mechanism inoperative, an actuating area for said member, and means including a single valve controlled port for selectively subjecting said area to pressure fluid causing the engagement of said clutch means and to partial vacuum effecting the release of said clutch means.

6. In a rock drill, the combination with a cylinder and a piston reciprocating therein and capable of rotation, of a mechanism for selectively effecting such rotation including a ratchet ring and a rifle bar operatively associated with said piston and ring, a non-rotatable member slidable into or out of locking position relative to said ring, an actuating area for said member, and means including passages for selectively admitting pressure fluid to said area or vacuumizing the same for effecting the slidable movement of said member into one or the other position.

JOHN C. CURTIS.